INVENTOR.
NICKLAS R. DEWITT
BY Naylor & Neal
ATTORNEYS

3,223,202
METHOD AND MEANS FOR RELINING BRAKES IN TRUCK AND TRAILER BRAKE SYSTEMS
Nicklas R. De Witt, 1316 67th St., Emeryville, Calif.
Filed Feb. 11, 1963, Ser. No. 257,380
4 Claims. (Cl. 188—78)

This invention relates to brake systems of automotive equipment, and more particularly to a method and means for relining the brakes of truck and trailer equipment without requiring the removal of the wheels of such equipment to accomplish this purpose.

With truck and trailer equipment, as well as with other automotive equipment, it is necessary to remove the wheels from the vehicle, thereby effecting removal also of the brake drums and exposing for maintenance the brake shoes which carry the brake lining material, if it becomes necessary to install new brake linings. Such wheel removal, particularly in connection with large and heavy truck and trailer equipment, is time consuming and relatively expensive from the cost of labor standpoint. An additional factor in this respect is that the vehicle must be jacked or otherwise raised so that the wheel to be removed is out of ground engagement.

The essential object of the present invention is to provide a method and means whereby brake linings may be removed and replaced in trucking equipment without requiring jacking of the vehicle or wheel removal.

This and other objects and advantages of the invention will be apparent from the following description taken in conjunction with the drawing forming part of this specification, and in which.

Figure 1:
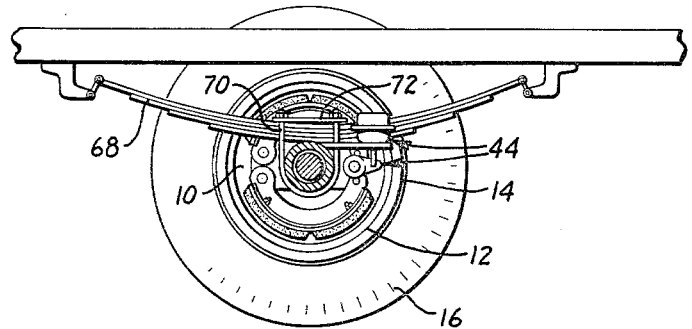
FIGURE 1 is a view in side elevation of a conventional wheel installation of a truck or trailer, the view being of the inner side of the wheel.
Figure 3:
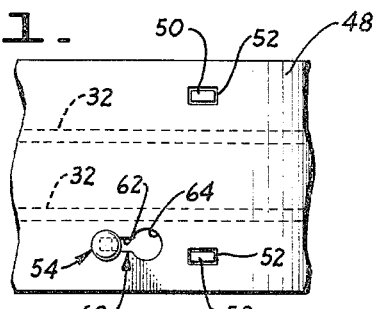
FIGURE 3 is a view taken along lines 3—3 of FIGURE 2.
Figure 2:
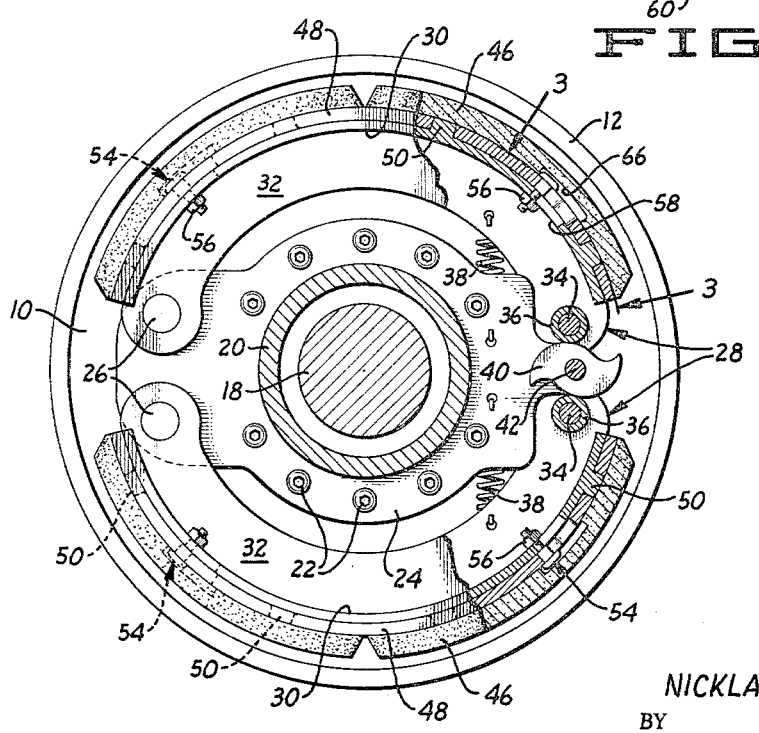
FIGURE 2 is an enlarged view, partly in side elevation and partly in section, of the brake system components of the truck or trailer wheel of FIGURE 1.

With reference to the drawing, the truck of tractor wheel assembly of FIGURE 1 comprises a wheel 10 having an inwardly directed annular flange, or brake drum, 12 and a rim 14, a tire 16 secured to the rim 14, a driving axle 18 to which the wheel 10 is fixedly secured, a stationary outer axle 20 having an outwardly directed flange to which there is secured by the attachment means 22 a brake shoe mounting plate 24. Pivotally secured to plate 24 by pin mountings 26 are a pair of alike brake shoes indicated generally at 28 and comprising arcuate flanges 30 and pairs of radially extending ramps 32.

The shoes 28 are provided at their free ends with pins 34 carried by the ramps 32, and the pins 34 carry sleeves 36 formed of suitable bearing material. Tension springs 38 having their ends secured to the shoes and the plate 24 maintain the sleeves 36 in engagement with a double eccentric 40, the latter being fixedly secured to an actuator rod 42 which is suitably supported for rotation and adapted to be rotated in a clockwise direction by the actuating means indicated generally at 44 in FIGURE 1 to cause the double eccentric 40 to urge the shoes 28 outwardly to engage the brake lining 46 with the brake drum 12.

The brake linings are bonded or riveted or otherwise secured to metal straps 48, the latter being removably attached by means now to be described to the flanges 30 of shoes 28.

The shoe flanges 30 are provided with a plurality of outwardly directed lugs 50 which extend into complementary shaped openings 52 formed in the metal straps 48. The connection afforded between the shoe flanges 30 and the metal straps 48 by the lugs 50 and the strap openings 52 adequately reacts the force applied by the drum 12 to the brake linings 46 to maintain the linings and the straps 48 against relative movement lengthwise of the shoe flanges 30.

Means securing the straps 48 and their attached linings 46 against unwanted radial movement outwardly with respect to the shoe flanges 30 comprise flat-headed carriage bolts 54, nuts 56 on the inner ends of the bolts, elongated slots 58 formed in the shoe flanges 30, elongated slots 60 formed in the metal straps 48, said latter slots having straight-sided narrow portions 62 and enlarged circular portions 64 which are of sufficient size to pass the heads of the bolts 54, and elongated recesses 66 formed in the undersides of the linings 46 to accommodate the heads of the bolts 54.

In trucks and trailers the brake housing space defined radially inwardly of brake drum 12 is unenclosed at the inner side of the wheel. This permits a degree of air cooling for the brakes. However this space is blocked to a considerable degree adjacent its upper portion, as by the chassis support springs 68, the spring shackle and plate elements 70 and 72, and the brake control means 44 (see FIG. 1). These blocking elements are located sufficiently close to the brake housing space to render it impossible to effect removal of the upper brake lining by axial movement of the same relative to the brake drum. However, this brake housing space is not fully blocked from the standpoint of access by hand to the nuts 56 and the interconnected linings and straps 46 and 48. Such limited access together with the means above described of removably connecting the metal straps 48 to the shoe flanges 30 enable the removal and replacement of the linings 46 without removal of the wheel from the vehicle. Such removal and replacement of the brake linings is accomplished in the following manner.

The lower lining 46 is removed by sufficiently backing off the nuts 56 on the carriage bolts 54 to enable the bolts 54 to be manually moved in slots 58 and 60 to bring the heads of the bolts into registry with the circular portion 64 of the key-hole-shaped slots 60. The straps 48 and their attached brake linings 46 may then be moved radially outwardly toward the brake drum 12, thereby freeing the straps 48 from the lugs 50 and from the bolts 54. The lower strap and its attached lining is then pulled in an axial direction out of the drum.

Similarly, with respect to the upper strap 48 and its attached lining 46, the nuts 56 are backed off and the bolts 54 are then moved within the slots 58 and 60 to bring the heads of the bolts into registry with the circular portions 64 of slots 60. The strap is then moved radially outwardly to clear it from the lugs 50, the bolts 54 being self-clearing by gravity with respect to the upper strap 48, and the strap and its attached lining are rotated by hand around the inside of the drum until they are positioned at the lower side of the drum. The strap is then withdrawn axially from the drum in the manner described above for the lower strap 48.

New straps and linings are then installed by reversing the above-described procedure. A new upper strap is moved axially into the drum at the lower side of the drum, rotated around to a position at the upper side of the drum where the apertures 52 in straps 48 are in registry with lugs 50, and then moved radially inwardly against the shoe flange 30. The heads of the bolts are then moved outwardly through the circular portions 64 of the slots 60. The bolts 54 are then moved within the slots 58 and 60 to the ends of the narrow portion 62 of the slots 60. The nuts 56 are then tightened on the bolts 54.

The lower new strap and lining is then axially introduced at the lower side of the drum and oriented so that the apertures 52 of strap 48 are in registry with lugs 50. The strap is then moved radially inwardly to engage the drum. This is followed by the appropriate manipulation of the carriage bolts and the tightening of the nuts 56.

The nuts 56 need not be removed from the bolts 54, and preferably they are not removed, during the course of removal and replacement of the brake linings. By maintaining the nuts on the bolts the bolts are maintained captive by the shoe flange slots 58, and consequently there is not need for relocating the bolts within the slots 58 and 60 and for reengaging the nuts with the bolts. The latter operation would be particularly difficult to perform within the blocked upper portion of the brake housing space.

It is to be noted that no problem is encountered with respect to retightening the nuts 56 on the bolts 54. The narrow portion 62 of the keyhole-shaped slot 60 lock the square shank portions of the bolts so that the bolts do not turn along with the nuts as the latter are tightened.

What I claim as new and desire to secure by Letters Patent is:

1. In a brake system of the type employed for trucks and trailers, said brake system including a wheel-borne brake drum, a pair of pivotally mounted brake shoes having flanges extending axially relative to said drum, a metal strap attached to each flange, a brake lining attached to each strap, with said drum defining therein a generally hand-accessible space including a station at which a metal strap and lining attached thereto may be axially moved into and out of said drum, and means normally maintaining said linings in radially inwardly spaced relation with respect to said drum: the improvement enabling removal and replacement of said attached strap and lining elements without the removal of said drum from its laterally surrounding position with respect to said brake shoes, said improvement comprising aligned elongated slots formed in said flanges and straps, headed bolts extending through said slots, elongated recesses formed in the radially inwardly directed sides of said linings adapted to accommodate the heads of said bolts, the slots in said straps having reduced portions through which said heads cannot pass and having enlarged portions through which said heads can pass, nuts on the radially inwardly directed ends of said bolts adapted when tightened to maintain said bolts in the reduced portions of said strap slots and adapted when loosened to enable said bolts to be moved arcuately to the enlarged portions of said strap slots to thereby condition said attached strap and lining elements for radial movement outwardly from said flanges for subsequent movement arcuately to said station and for subsequent movement axially out of said drum at said station.

2. A method for removing a brake lining and its carrier strap in a brake system of the type employed in trucks and trailers without removing the brake drum element of said system comprising connecting a carrier strap to a brake shoe in such a manner that it may be freed from the shoe, for subsequent arcuate movement of the strap and its attached lining, by a degree of radial movement outwardly of said strap and lining toward the braking surface of the drum, said degree of radial movement being less than the radial distance between the outer face of said lining and the braking surface of said drum when said shoe is in its retracted position, disconnecting said strap from said shoe to enable radial movement outwardly of said strap and its attached lining, radially moving said strap and its attached lining outwardly to free said strap from said shoe, arcuately moving said strap and its attached lining along the braking surface of the drum to position said strap and lining below the axle of the truck or trailer, and withdrawing said strap and lining axially out of said drum.

3. A method for removing a brake lining and its carrier strap in brake systems of the type employed in trucks and trailers without removing the brake drum element of said system comprising connecting a carrier strap to a brake shoe so that it may be disconnected from the shoe and moved with its attached lining arcuately around the drum adjacent the braking surface of the drum, disconnecting said strap from said shoe, arcuately moving the strap and its attached lining around the drum adjacent the braking surface thereof until the strap and lining is positioned below the axle of the truck or trailer, and withdrawing said strap and lining out of said drum.

4. In a brake system of the type employed for trucks and trailers, said brake system including a wheel-borne brake drum having a radially inwardly disposed surface, a pair of pivotally mounted brake shoes having flanges extending axially relative to said drum, a metal strap attached to each flange, and a brake lining, having a radially outwardly disposed surface, attached to each strap, with said drum defining therein a generally hand-accessible space including a station at which a metal strap and lining attached thereto may be axially moved into and out of said drum: the improvement enabling removal and replacement of said attached strap and lining elements without the removal of said drum from its laterally surrounding position with respect to said brake shoe, said improvement comprising means for connecting and disconnecting said straps and flanges, said means including first means for maintaining said straps against said flanges and second means for preventing relative arcuate movement between said straps and said drum, at least said first means being hand-accessible within said space for connectably and disconnectably operating the same, said first means, when in a disconnectably operated condition, enabling the disconnection of said second means by radially outward movement to a predetermined degree of said straps relative to said flanges, the radially inwardly disposed surface of said drum and the radially outwardly disposed surfaces of said linings being normally spaced apart a radial distance which is at least as great as the radial distance corresponding to said predetermined degree, thereby enabling axial withdrawal of said straps and attached linings from said drum at said station and enabling arcuate movement of at least one of said straps and its attached lining within said drum to said station.

References Cited by the Examiner
UNITED STATES PATENTS

| | | | |
|---|---|---|---|
| 1,771,595 | 7/1930 | Thompson | 188—234 |
| 1,909,256 | 5/1933 | Emmord | 188—250 |
| 2,291,525 | 7/1942 | Bessey | 188—242 |

ARTHUR L. LA POINT, *Primary Examiner.*

RALPH D. BLAKESLEE, *Examiner.*